(12) United States Patent
Chen et al.

(10) Patent No.: US 12,219,518 B2
(45) Date of Patent: Feb. 4, 2025

(54) METHOD OF PERFORMING PAGING RECEPTION AND RELATED DEVICE

(71) Applicant: SHARP KABUSHIKI KAISHA, Sakai (JP)

(72) Inventors: Hung-Chen Chen, Taipei (TW); Mei-Ju Shih, Taipei (TW); Yung-Lan Tseng, Taipei (TW); An-An Lee, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 297 days.

(21) Appl. No.: 17/708,479

(22) Filed: Mar. 30, 2022

(65) Prior Publication Data

US 2022/0322269 A1    Oct. 6, 2022

Related U.S. Application Data

(60) Provisional application No. 63/168,154, filed on Mar. 30, 2021.

(51) Int. Cl.
*H04W 60/00* (2009.01)
*H04W 68/00* (2009.01)
*H04W 88/06* (2009.01)

(52) U.S. Cl.
CPC ....... *H04W 60/005* (2013.01); *H04W 68/005* (2013.01); *H04W 88/06* (2013.01)

(58) Field of Classification Search
CPC .......................... H04W 60/005; H04W 68/005
USPC ....................................................... 455/435.1
See application file for complete search history.

(56) References Cited

U.S. PATENT DOCUMENTS

| 2020/0053830 A1 | 2/2020 | Venkataraman et al. |
| 2020/0329455 A1 | 10/2020 | Ryu et al. |

FOREIGN PATENT DOCUMENTS

| CN | 111386742 A | 7/2020 |
| CN | 114175814 A | 3/2022 |
| WO | 2018161244 A1 | 9/2018 |
| WO | 2020243265 A1 | 12/2020 |

OTHER PUBLICATIONS

Sony: "Discussion on paging collision avoidance in Multi-SIM", 3GPP Draft; R2-2100900, Jan. 25, 2021-Feb. 5, 2021 Jan. 14, 2021 (Jan. 14, 2021), p. 2-p. 4.

(Continued)

*Primary Examiner* — Joel Ajayi
(74) *Attorney, Agent, or Firm* — ScienBiziP, P.C.

(57) ABSTRACT

A method for a user equipment (UE) for performing a paging reception is provided. The method includes determining whether the UE registers to a first network associated with an Evolved Packet Core (EPC) network; determining whether to transmit a requested offset value for a paging occasion calculation to the first network after the UE determines that the UE registers to the first network; transmitting, to the first network, the requested offset value after the UE determines to transmit the requested offset value to the first network; receiving, from the first network, a configured offset value for the paging occasion calculation; forwarding, by a Non-Access-Stratum (NAS) layer of the UE, to a lower layer of the UE, the configured offset value; and performing the paging reception based on a first UE identity (ID), wherein the first UE ID is determined based on the configured offset value.

12 Claims, 3 Drawing Sheets

(56) References Cited

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) procedures in idle mode (Release 16)", V16.3.0 (Dec. 2020).
3GPP TS 38.304, "3rd Generation Partnership Project; Technical Specification Group Radio Access Network; NR; User Equipment (UE) procedures in Idle mode and RRC Inactive state (Release 16)", V16.3.0 (Dec. 2020).
3GPP TR 22.834, "3rd Generation Partnership Project; Technical Specification Group Services and System Aspects; Study on Support for Multi-USIM Devices (Release 17)", V17.2.0 (Dec. 2019).
3GPP TS 24.301, "3rd Generation Partnership Project; Technical Specification Group Core Network and Terminals; Non-Access-Stratum (NAS) protocol for Evolved Packet System (EPS); Stage 3 (Release 17)", V17.2.0 (Mar. 2021).
3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 16)", V16.10.0 (Mar. 2021).
3rd Generation Partnership Project; Technical Specification Group Services and System Aspects; Study on system enablers for devices having multiple Universal Subscriber Identity Modules (USIM) (Release 17), 3GPP TR 23.761 V1.3.0 (Mar. 2021).

METHOD OF PERFORMING PAGING RECEPTION AND RELATED DEVICE

CROSS-REFERENCE TO RELATED APPLICATION(S)

The present disclosure claims the benefit of and priority to U.S. Provisional Patent Application Ser. No. 63/168,154, filed on Mar. 30, 2021, entitled "PAGING COLLISION AVOIDANCE MECHANISM IN MULTI-SIM OPERATION," the content of which is hereby incorporated herein fully by reference into the present disclosure.

FIELD

The present disclosure is generally related to wireless communications and more specifically, to a method of performing a paging reception and a related device.

BACKGROUND

Abbreviation used in this disclosure include:

| Abbreviation | Full name |
| --- | --- |
| 3GPP | 3rd Generation Partnership Project |
| 5G | 5th generation |
| 5GC | 5G Core Network |
| AS | Access Stratum |
| BS | Base Station |
| CA | Carrier Aggregation |
| CMAS | Commercial Mobile Alert System |
| DC | Dual Connectivity |
| DCI | Downlink Control Information |
| DL | Downlink |
| DRX | Discontinuous Reception |
| DSDA | Dual SIM Dual Active |
| DSDS | Dual SIM Dual Standby |
| E-UTRA | Evolved Universal Terrestrial Radio Access |
| eMBB | enhanced Mobile Broadband |
| EN-DC | E-UTRA NR Dual Connectivity |
| EPC | Evolved Packet Core |
| EPS | Evolved Packer System |
| ETWS | Earthquake and Tsunami Warning System |
| ID | Identifier |
| IE | Information Element |
| LTE | Long Term Evolution |
| MAC | Medium Access Control |
| MAC CE | MAC Control Element |
| MCG | Master Cell Group |
| MIMO | Multi-Input Multi-Output |
| mMTC | massive Machine-Type Communication |
| MN | Master Node |
| MR-DC | Multi-Radio Dual Connectivity |
| MSG | Message |
| MSGA | Message A |
| MSGB | Message B |
| NAS | Non-Access Stratum |
| NE-DC | NR-E-UTRA Dual Connectivity |
| NGEN-DC | NG-RAN E-UTRA-NR Dual Connectivity |
| NPN | Non-Public Network |
| NR | New Radio |
| NR-DC | NR-Dual Connectivity |
| NW | Network |
| PCell | Primary Cell |
| PDCCH | Physical Downlink Control Channel |
| PDSCH | Physical Downlink Shared Channel |
| PF | Paging Frame |
| PHY | Physical (layer) |
| PLMN | Public Land Mobile Network |
| PNI-NPN | Public Network Integrated Non-Public Network |
| PO | Paging Occasion |
| PRACH | Physical Random Access Channel |
| PUCCH | Physical Uplink Control Channel |
| PUSCH | Physical Uplink Shared Channel |
| RA | Random Access |
| RAN | Radio Access Network |
| RAT | Radio Access Technology |
| RF | Radio Frequency |
| RRC | Radio Resource Control |
| RX | Reception |
| SCell | Secondary Cell |
| SCG | Secondary Cell Group |
| SFN | System Frame Number |
| SIM | Subscriber Identity Module |
| SN | Secondary Node |
| SNPN | Stand-alone Non-Public Network |
| TA | Timing Advance |
| TDM | Time Division Multiplexing |
| TR | Technical Report |
| TS | Technical Specification |
| TX | Transmission |
| UE | User Equipment |
| UL | Uplink |
| URLLC | Ultra-Reliable and Low-Latency Communication |
| USIM | Universal Subscriber Identity Module |
| V2X | Vehicle-to-Everything |

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability for optimizing the network services and types, and accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication in the next-generation wireless communication system.

SUMMARY

The present disclosure provides a method of performing a paging reception and a related device.

According to an aspect of the present disclosure, a method for a user equipment (UE) for performing a paging reception is provided. The method includes determining whether the UE registers to a first network associated with an Evolved Packet Core (EPC) network; determining whether to transmit a requested offset value for a paging occasion calculation to the first network after the UE determines that the UE registers to the first network; transmitting, to the first network, the requested offset value after the UE determines to transmit the requested offset value to the first network; receiving, from the first network, a configured offset value for the paging occasion calculation; forwarding, by a Non-Access-Stratum (NAS) layer of the UE, to a lower layer of the UE, the configured offset value; and performing the paging reception based on a first UE identity (ID), wherein the first UE ID is determined based on the configured offset value.

According to another aspect of the present disclosure, a UE for performing a paging reception is provided. The UE includes a processor configured to execute a computer-executable program, and a memory coupled to the processor and configured to store the computer-executable program, wherein the computer-executable program instructs the processor to perform the above-disclosed method of performing a paging reception.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
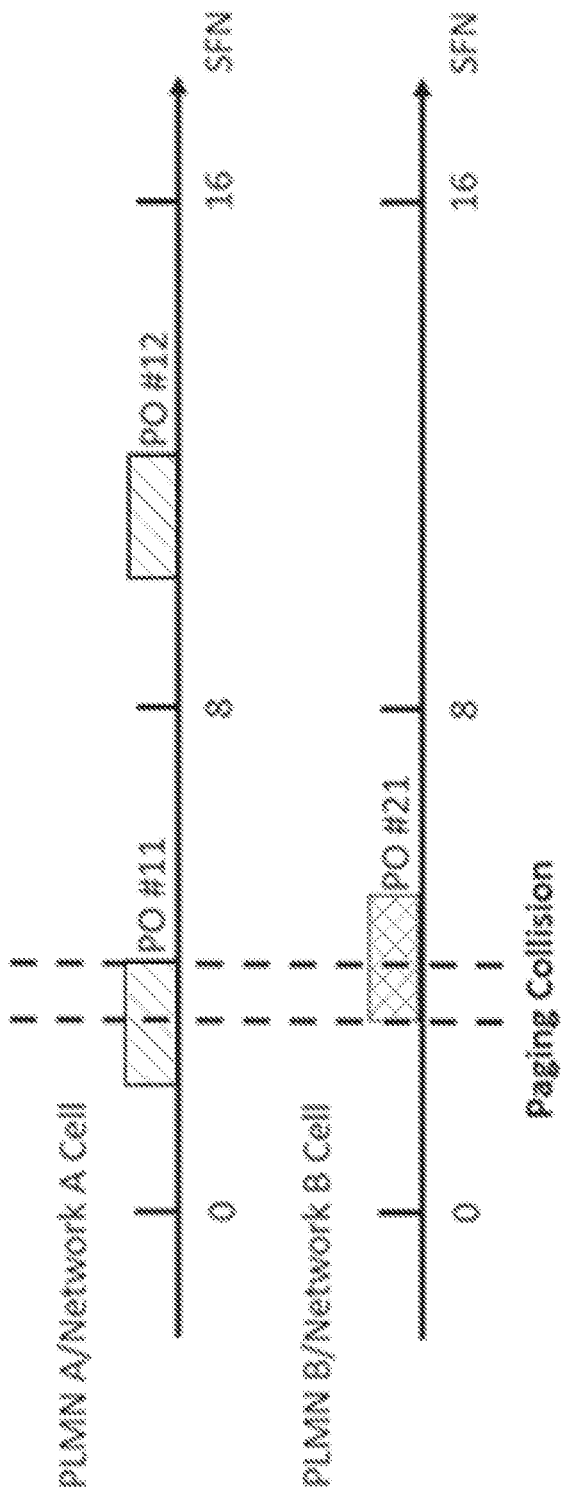
FIG. 1 is a schematic diagram illustrating a paging collision in the time domain, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is illustrated in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Further, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE according to the present disclosure may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

ABS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are applicable in NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data may be included. The respective portions of the DL transmission data, the guard period, and the UL transmission data should also be configurable, for example, based on the network dynamics of NR. An SL resource may also be provided via an NR frame to support ProSe services or V2X services.

For a multi-USIM (or multi-SIM) UE or a dual-USIM (or dual-SIM) UE, the UE may connect or register to one or more networks from which the UE may receive pages. Specifically, a multi-USIM (or multi-SIM) UE with multiple USIMs may be capable of maintaining a separate registration state with a PLMN for each USIM (or SIM). Depending on the UE capabilities (e.g., RX and TX capabilities), the RX of the UE may be occupied to receive/monitor pages from one network while pages from other networks may also be received. Therefore, a mechanism for avoiding a collision of the page reception when the UE is in an IDLE State (e.g., the RRC_IDLE State) or an Inactive State (e.g., the RRC_INACTIVE State) in more than one (registered/selected) networks associated with the respective SIMS is required.

In the present disclosure, the mechanism for a multi-USIM/multi-SIM UE to resolve the paging collisions in a plurality of networks associated with respective SIMS is disclosed. Moreover, the cross-layer interaction (e.g., between the AS/RRC layer and the NAS layer) within the multi-USIM/multi-SIM UE (or UE in the multi-USIM/multi-SIM operation) to avoid the paging collisions is also disclosed in the present disclosure.

A multi-SIM device (or a dual-SIM device) may be, but not limited to, operated either in a Dual SIM Dual Standby (DSDS) mode or a Dual SIM Dual Active (DSDA) mode. The DSDS and DSDA are defined as follows (e.g., as introduced in the 3GPP TR 22.834).

DSDS: both SIMS may be used for the idle-mode network connection, but when a radio connection (e.g., the first connection) is active, the second connection is disabled. The SIMS in a DSDS device may share a single transceiver. Through time multiplexing, the two radio connections are maintained in idle mode. When the UE is in-call in a network associated with the first SIM, the UE may not be able to maintain the radio connection to the network associated with the second SIM. Hence, the connection to the network associated with the second SIM is unavailable for the duration of the call. However, the registration to the second network may still be maintained.

DSDA: both SIMS can be used in both idle and connected modes. Each SIM in a DSDA device has a dedicated transceiver. There are no interdependencies on idle or connected mode operations at the modem level.

Multi-SIM devices may support DSDS or DSDA with different architectures (e.g., single RX/single TX, dual RX/single TX and dual RX/dual TX). A single RX UE is not capable of receiving data traffic from two networks at the same time, whereas a dual RX UE may be able to receive data traffic from two networks at the same time. Similarly, a single TX UE may not be capable of transmitting data traffic to two networks at the same time, whereas a dual TX UE may be able to transmit data traffic to two networks at the same time.

In multi-SIM scenarios, a UE may be (pre)configured or installed with at least two USIMs. A USIM may be a physical SIM or an eSIM. The USIMs of the UE may belong to the same operator or may belong to different operators. An operator may be a public network operator (e.g., a PLMN operator), or a non-public network (e.g., an SNPN operator, a PNI-NPN operator, etc.). The network of one USIM (e.g., associated with the Network A) may be, but is not limited to, NR, LTE connected to 5GC, LTE connected EPC, multi-connectivity (e.g., EN-DC, NE-DC, NGEN-DC, NR-DC). For example, a UE with two USIMs may operate in both Network A (e.g., NR or LTE) and Network B (e.g., NR or LTE). In some examples, the core network of the Network A may be the same as the core network of the Network B. In some other examples, the core network of the Network A may be different from the core network of the Network B. In a case of LTE connected to EPC, the Network A may refer to LTE and the core network of the Network A may refer to EPC. In a case of NR connected to 5GC, the Network A may refer to NR and the core network of the Network A may refer to the 5GC. The UE may be equipped with single-TX and single-RX, single-TX and dual-RX, or dual-TX and dual-RX.

It should be noted that the terms "dual SIM" and "dual USIM" may be used interchangeably in this disclosure. That is, the term "dual SIM" and the term "dual USIM" may be exchangeable in some implementations of the present disclosure.

It should also be noted that the terms "multi SIM" and "multi USIM" may be used interchangeably in this disclosure. The terms "multi-SIM" and "multi-USIM" may also be used interchangeably in this disclosure. That is, the term "multi SIM" and the term "multi USIM" may be exchangeable in some implementations of the present disclosure. The term "multi-SIM" and the term "multi-USIM" may be exchangeable in some implementations of the present disclosure. The term "NAS layer" and the term "NAS entity" may be exchangeable in some implementations of the present disclosure. The term "RRC layer" and the term "RRC entity" may be exchangeable in some implementations of the present disclosure. The term "AS layer" and the term "AS entity" may be exchangeable in some implementations of the present disclosure. In some implementations of the present disclosure, "network A" may be interpreted as "PLMN A" and "network B" may be interpreted as "PLMN B."

Paging Collision Determination/Paging Collision Detection

In some implementations, the UE with dual SIM (or multi SIM) and single-TX/single-RX may experience paging collision. The UE (e.g., the RRC entity of the UE or the NAS layer of the UE) may determine whether a paging collision happens on the plurality of networks and may trigger one or more actions, such as any combination of Action #1, Action #2, and Action #3, as described below, to avoid paging collisions. For example, a UE may trigger a procedure to change PF(s)/PO(s) for a network, to change the NAS parameters or RRC parameters for the paging reception, to change the current UE ID, but not limited to).

In some implementations, a UE that performs a multi-SIM operation (or a dual-SIM operation) and/or that is equipped with single-TX/single-RX may experience paging collisions. The UE (e.g., the AS/RRC layer of the UE or the NAS layer of the UE) may determine whether a paging collision has happened on the plurality of networks and may trigger one or more actions to avoid such a paging collision (e.g., triggering a procedure to change PF(s)/PO(s) for a network, to change the NAS parameters or RRC parameters for the paging reception, or to change the current UE ID, etc.).

The paging collision may mean that the paging monitoring occasions for different SIMS (or the associated networks) are overlapping in the time domain, which may result in missing pagings (e.g., a paging DCI or a paging message may be missed from the UE's perspective). FIG. 1 is a schematic diagram illustrating a paging collision in the time domain, according to an implementation of the present disclosure. In FIG. 1, the UE with dual SIM (or multi SIM) and equipped with single-TX/single-RX may camp on a cell of the PLMN A (or Network A) associated with the SIM #1 and may also camp on a cell of the PLMN B (or Network B) associated with the SIM #2. Based on the paging factors (or parameters) of the PLMN A (or Network A), the UE may monitor the paging occasions PO #11 and PO #12. Besides, based on the paging factors (or parameters) of the PLMN B (or Network B), the UE may monitor the paging occasion PO #21. As a result, the PO #11 and PO #21 may overlap in the time domain (e.g., SFN) and the UE may experience a paging collision. Moreover, based on the PF/PO formula with the paging factors (or parameters) of the PLMN A (or Network A), the UE may derive the time resource location and/or frequency resource location of the PO #11. Based on the PF/PO formula with the paging factors (or parameters) of the PLMN B (or Network B), the UE may derive the time resource location and/or frequency resource location of the PO #21. However, if the time and/or frequency resource locations of the PO #11 and the time and/or frequency resource locations of the PO #21 overlap (e.g., partial overlapping or full overlapping), the UE with single-RX may not successfully receive and/or decode both the paging DCI from the cell of the Network A in the PO #11 and the paging DCI from the cell of the Network B in the PO #21. In some implementations, when the PLMN A (or the Network A/the cell of the Network A) and the PLMN B (or the Network B/the cell of the Network B) are operated on the same spectrum/frequency band/frequency carrier, the UE with dual SIM (or multi SIM) and single-TX/single-RX may not experience the paging collision. In some implementations, when the PLMN A (or the Network A/the cell of the Network A) and the PLMN B (or the Network B/the cell of the Network B) are operated on the same spectrum/frequency band/frequency carrier, the UE with dual SIM (or multi SIM) and single-TX/single-RX may not perform any mechanism for the paging collision resolution (e.g., omit monitoring a PO of one of the networks or apply a new paging parameters/factors).

In some implementations, the UE may perform the paging collision determination after the UE successfully registers to the Network A and the Network B. In some implementations, the UE may stop performing the paging collision determination if the UE de-registers from one of the two networks or switches the multi-SIM operation to "OFF". In some implementations, the UE may perform the paging collision determination after the UE receives a request from the upper layer (e.g., the NAS layer or the application layer). In some implementations, the UE may stop performing the paging collision determination after the UE receives a request from the upper layer (e.g., the NAS layer or the application layer).

It should be noted that the paging occasions in EPS (with EPC) are determined or calculated based on a UE ID (e.g., a permanent subscription identifier (IMSI), etc.). The formula and related parameters for calculating the PF and the PO in EPS may be predefined (e.g., as defined in the 3GPP TS 36.304).

The paging occasions in the 5GS (with 5GC) are determined or calculated based on a UE ID (e.g., a temporary identifier (5G-S-TMSI), etc.) that may be reassigned over time. The formula and related parameters for calculating the PF and the POs in 5GS may be predefined (e.g., as defined in the 3GPP TS 38.304).

For example, the PF and PO for the paging may be determined by the following formula:
SFN for the PF is determined by:

$(SFN+PF\_\text{offset}) \bmod T = (T \operatorname{div} N)*(UE\ ID \bmod N)$.

Index (i_s), indicating the index of the PO is determined by:

$i\_s = \operatorname{floor}(UE\ ID/N) \bmod Ns$.

where UE ID may be:
UE ID: IMSI mod 1024 (in the EPS).
UE ID: 5G-S-TMSI mod 1024 (in the 5GS).

Actions to be Taken to Avoid Paging Collision

In some implementations, the UE may be configured to use at least one of the actions (e.g., Action #1, Action #2, and Action #3, as shown in the following implementations) to resolve the paging collision (or to avoid the paging collision). For example, the multi SIM (or dual SIM) UE may inform, the network, that the UE supports multi-SIM feature(s) (or the multi-SIM operation is "ON") via the serving cell. Accordingly, the network may respond which action(s) may be taken for resolving the paging collision when the paging collision is detected (or happens). In some implementations, the UE may indicate to the network which action(s) the UE supports for resolving the paging collision. In some implementations, the UE may determine which action(s) to be taken based on the associated CN type. For example, the UE may be allowed to take action #1 for the 5GC and take action #2 for the EPC. In some implementations, the UE may be allowed to take action #3 regardless of the CN type.

Action #1

In some implementations, when the (multi-SIM) UE determines that a paging collision has happened (or detects a paging collision), the (multi-SIM) UE may initiate/trigger a UE ID reassignment procedure (e.g., to request a new UE ID for a new 5G-GUTI, a new 5G-S-TMSI, or a new IMSI). It should be noted that the 5G-S-TMSI may be derived from the 5G-GUTI. For example, when the multi-SIM UE registers to the Network A and the Network B, the UE may initiate/trigger the UE ID reassignment procedure with one of the networks (e.g., the Network A or the Network B). In some implementations, when the UE determines or detects that a paging collision has happened, the (multi-SIM) UE may initiate/trigger the UE ID reassignment procedure with the selected network among the Network A and the Network B based on at least one of the UE implementations, pre-defined rules, configurations, policies from operators, NW commands, network priority, randomly, UE NAS determination, UE AS determination, and supporting the UE ID reassignment procedure of a network. It should be noted that the UE may only initiate/trigger the UE ID reassignment procedure with the registered network.

In some implementations, when the UE selects a network related to the 5GS (or 5GC) to initiate/trigger the UE ID reassignment procedure (e.g., a registration procedure, a UE configuration update procedure, a PDU session establishment procedure, a PDU session modification procedure, or a Tracking Area Update (TAU) procedure), the UE (e.g., the NAS layer of the UE, the AS layer of the UE) may calculate or determine a new UE ID (e.g., a new 5G-S-TMSI) as assistance information for the 5GS (or 5GC, or AMF) to reassign the UE ID. For example, the UE may transmit the new UE ID to inform the 5GS (or 5GC, or AMF). The new UE ID may be transmitted via NAS signaling (e.g., a registration request message, a PDU session establishment request message, or a new NAS signaling) or RRC signaling (e.g., an RRC setup request message, an RRC setup complete message, an RRC resume request message, an RRC resume complete message, or a new RRC message).

In some implementations, based on the configurations transmitted from the network (e.g., via the NAS signaling, the dedicated signaling, or the broadcasting system information) to the UE via the serving cell, the UE may determine whether to calculate or determine the new UE ID. In some implementations, based on the configurations transmitted from the network (e.g., via the NAS signaling, the dedicated signaling, or the broadcasting system information) to the UE via the serving cell, the UE may determine whether to transmit the new UE ID to the 5GS (or 5GC, or AMF). In some implementations, after the UE determines to determine or calculate the new UE ID, the UE may determine whether to transmit the new UE ID to the 5GS (or 5GC, or AMF) based on the configuration transmitted from the network (e.g., via the NAS signaling, the dedicated signaling, or the broadcasting system information).

In some implementations, when the UE selects a network related to the 5GS (or 5GC) to initiate/trigger the UE ID reassignment procedure, the UE may transmit a UE ID reassignment indication or other assistance information (e.g., paging parameters/PF(s)/PO(s) of another network, or suggested DRX configuration/parameters/cycle) to inform the 5GS (or 5GC). The UE ID reassignment indication or other assistance information may be transmitted via the NAS signaling (e.g., a registration request message, a PDU session establishment request message, or a new NAS signaling) or the RRC signaling (e.g., an RRC setup request message, an RRC setup complete message, an RRC resume request message, an RRC resume complete message, or a new RRC message). Thus, the 5GS (or 5GC) or the corresponding AMF may respond a new UE ID to the UE. For example, the UE may transmit the new UE ID (e.g., a new 5G-S-TMSI), the UE ID reassignment indication and/or other assistance information in a Registration Request message. Therefore, the 5GS (or 5GC) or the corresponding AMF may respond a new UE ID in a Registration Accept message to the UE via the serving cell. In some examples, the new UE ID received from the 5GS (or 5GC) may be the same as the one determined/calculated/suggested by the UE. In some examples, the new UE ID received from the 5GS (or 5GC) may not be the same as the one determined/calculated/suggested by the UE.

In some implementations, the new UE ID received from the 5GS (or 5GC) may be used by the UE to replace the existing UE ID for the corresponding/selected network stored in the UE. That is, the received UE ID may be used for PF/PO calculation and for monitoring paging record(s) in paging message(s). In some implementations, the new UE ID received from the 5GS (or 5GC) may be indicated (or pre-configured) to be used for PF/PO calculation only and not used for monitoring paging record(s) in paging message(s). In some implementations, based on the configurations transmitted from the network (e.g., via the NAS signaling, the dedicated signaling, or the broadcasting system information) to the UE, the UE may determine whether to transmit a UE ID reassignment indication and/or other assistance information to the 5GS (or 5GC, or AMF).

In some implementations, when the UE selects a network related to the EPS (or EPC) to initiate/trigger the UE ID reassignment procedure (e.g., a registration procedure, an attach procedure, a UE configuration update procedure, a PDN connectivity procedure or a Tracking Area Update procedure), the UE may not provide any new UE ID as assistance information for EPS (or EPC, or MME), for example, to request a UE ID.

In some implementations, when the UE selects a network related to the EPS (or EPC) to initiate/trigger the UE ID reassignment procedure (e.g., a registration procedure, an attach procedure, a UE configuration update procedure, a PDN connectivity procedure, or a Tracking Area Update procedure), the UE (e.g., the NAS layer of the UE, the AS layer of the UE) may determine or calculate a new UE ID as assistance information for EPS (or EPC, or MME) to request a UE ID. The UE may transmit the new UE ID to inform the EPS (or EPC, or MME). The new UE ID may be transmitted to the EPS (or EPC, or MME) via NAS signaling (e.g., an attach request message, a PDU connection request message, or a new NAS signaling) or RRC signaling (e.g., an RRC setup request message, an RRC setup complete message, an RRC resume request message, an RRC resume complete message, or a new RRC message). In some implementations, based on the configurations transmitted from the network (e.g., via the NAS signaling, the dedicated signaling, or the broadcasting system information) to the UE via the serving cell, the UE may determine whether to determine or calculate a new UE ID. In some implementations, based on the configurations transmitted from the network (e.g., via the NAS signaling, the dedicated signaling, or the broadcasting system information) to the UE via the serving cell, the UE may determine whether to transmit a new UE ID to the EPS (or EPC, or MME). In some implementations, after the UE determines to determine or calculate a new UE ID, the UE may determine whether to transmit the new UE ID to EPS (or EPC, or MME) based on the configurations transmitted from the network (e.g., via NAS signaling, dedicated signaling, or broadcasting system information) to the UE via the serving cell. In some implementations, when the UE selects a network related to the EPS (or EPC) to initiate/trigger the UE ID reassignment procedure, the UE may transmit a UE ID reassignment indication or other assistance information (e.g., paging parameters/PF(s)/PO(s) of another network, or suggested DRX configuration/parameters/cycle) to inform EPS (or EPC, or MME). The EPS (or EPC) or the corresponding MME may respond a new UE ID to the UE. For example, the UE may transmit at least one of a new UEID (e.g., a new 5G-S-TMSI), a UE ID reassignment indication and other assistance information to the EPS (or EPC, or MME) via the Attach Request message. The EPS (or EPC) or the corresponding MME may respond a new UE ID to the UE via the serving cell via the Attach Accept message. Note that, in some examples, the new UE ID received from the 5GS (or 5GC) may be the same as the one determined/calculated/suggested by the UE. In some examples, the new UE ID received from the 5GS (or 5GC) may not be the same as the one determined/calculated/suggested by the UE. In some implementations, the new UE ID received from the EPS (or EPC) may be used by the UE to replace the existing UE ID for the corresponding/selected network stored in the UE. That is, the received UE ID may be used for PF/PO calculation and for monitoring paging record(s) in paging message(s). In some implementations, the new UE ID received from the EPS (or EPC) may be indicated (or pre-configured) to be used for PF/PO calculation only and not used for monitoring paging record(s) in paging message(s). The UE ID reassignment indication or other assistance information may be transmitted via the NAS signaling or the RRC signaling. In some implementations, based on the configurations transmitted from the network (e.g., the NAS signaling, the dedicated signaling, or the broadcasting system information) to the UE, the UE may determine whether to transmit a UE ID reassignment indication and/or other assistance information to EPS (or EPC, or MME).

It should be noted that the suggested DRX configuration, as mentioned above, may be, but is not limited to, one of the following:
  Cell-level DRX (a DRX value pre-configured at the BS and sent to all UEs in a cell through broadcast messages).
  UE-level DRX (for the calculation of PF and PO by the UE in the RRC_IDLE state, the DRX parameters/configuration is sent by the core network (e.g., the MME/AMF) to the BS, and the BS further transmits the DRX parameters/configuration to the UE).
  RAN-level DRX (for the calculation of PF and PO by the UE in the RRC_INACTIVE state, the DRX parameters/configuration is also sent by the core network to the BS, and the BS further transmits the DRX parameters/configuration to the UE).

In some implementations, when the UE initiates/triggers an ID reassignment procedure, the UE may (re)start a timer T1. In some implementations, when the value of the timer T1 is reconfigured, the UE may re(start) the timer T1. In some implementations, the UE may (re)start the timer T1 after the UE ID reassignment procedure is successfully completed. In some implementations, when the timer T1 is running, the UE is prohibited to initiate/trigger another UE ID reassignment procedure. The UE may maintain, start, restart, or stop the timer T1.

In some implementations, the timer T1 may stop if at least one of the following criteria is satisfied:
  (1) The paging collision is resolved.
  (2) A cell (re)selection procedure is performed (e.g., a cell (re)selection procedure is performed on the Network A or Network B).
  (3) The selected/registered PLMN is changed.
  (4) The selected RAT is changed (e.g., the selected RAT of network A or network B is changed).
  (5) The NAS layer of the UE switches to the SNPN access mode (or the SNPN access mode is activated).
  (6) The associated CN type is changed (e.g., the associated CN type of the Network A or the Network B is changed).
  (7) The multi-SIM operation status is changed (e.g., the multi-SIM operation is switched to "OFF").
  (8) The UE receives a new offset.
  (9) The UE receives the response from network.
  (10) The value of the timer T1 is reconfigured.
  (11) The UE leaves a valid area.
  (12) RRC state transitions (e.g., while the UE moves to the RRC Connected state or while the UE moves to the RRC idle state)
  (13) De-registered from one network.
  (14) UE's status (e.g., paging reception status) on the Network B changes if the selected network is the Network A. For example, the UE ID associated with the Network B has been changed by the Network B.
  (15) The UE ID reassignment procedure is successfully completed.
  (16) The UE ID reassignment procedure fails (e.g., a NW rejection message is received).
  (17) The UE receives a new UE ID from the core network via the serving cell.

In some implementations, if the paging collision is resolved, the UE may abort the initiated/triggered/ongoing UE ID reassignment procedure (e.g., a registration procedure, an attach procedure, a UE configuration update procedure, a PDU session establishment procedure, a PDU connectivity procedure, or a TAU procedure). In some implementations, the UE may inform the associated core network (e.g., EPC or 5GC), via the serving cell, that the initiated/triggered/ongoing UE ID reassignment procedure is aborted (e.g., via the NAS message).

In some implementations, if a cell (re)selection procedure is performed, the UE may abort the initiated/triggered/ongoing UE ID reassignment procedure (e.g., a registration procedure, an attach procedure, a UE configuration update procedure, a PDU session establishment procedure, a PDU connectivity procedure, or a TAU procedure). The UE (e.g., the AS/RRC layer of the UE) may inform the upper layer (e.g., the NAS layer) that the cell (re)selection procedure is performed. The NAS layer of the UE may abort the initiated/triggered UE ID reassignment procedure when the NAS layer of the UE is informed that a cell (re)selection procedure is performed. After the UE selects a new camped cell (e.g., a suitable cell, an acceptable cell) (or when the cell (re)selection procedure is complete, the (multi-SIM) UE (or the UE with multi-SIM status "ON") may determine if any paging collision event happens again.

In some implementations, if the multi-SIM operation status is changed (e.g., the multi-SIM operation is switched to "OFF"), the UE may abort the initiated/triggered/ongoing UE ID reassignment procedure (e.g., a registration procedure, an attach procedure, a UE configuration update procedure, a PDU session establishment procedure, a PDU connectivity procedure, or a TAU procedure).

In some implementations, if the selected/registered PLMN is changed, the selected RAT is changed, the associated CN type is changed, the UE's RRC state is changed, the SNPN access mode is switched, or de-registering from the selected network, the UE may abort the initiated/triggered/ongoing UE ID reassignment procedure (e.g., a registration procedure, an attach procedure, a UE configuration update procedure, a PDU session establishment procedure, a PDU connectivity procedure, or a TAU procedure).

In some implementations, if the UE leaves a valid area, the UE may abort the initiated/triggered/ongoing UE ID reassignment procedure (e.g., a registration procedure, a UE configuration update procedure, or a TAU procedure). The valid area may be configured by the network. The valid area may be a tracking area, a RAN notification area, a system information area, or any other area configured by the network.

In some implementations, if the initiated/triggered/ongoing UE ID reassignment procedure is aborted by the upper layer (e.g., NAS layer) of the UE, the UE may inform the lower layer (e.g., the AS layer or the RRC layer) to stop/suspend to setup/resume the connection to a network (e.g., a BS). For example, if an RRC connection procedure (or an RRC resume procedure) is ongoing for initiating/triggering the UE ID reassignment procedure and the multi-SIM operation is switched to be "OFF", the NAS layer of the UE may abort the initiated/triggered/ongoing UE ID reassignment procedure and may inform the RRC layer (or AS layer) of the UE to stop/suspend the RRC connection procedure (or the RRC resume procedure) accordingly.

In some implementations, when the timer T1 expires, the UE may initiate/trigger the UE ID reassignment procedure with another network.

In some implementations, when the timer T1 expires, the UE may initiate/trigger the UE ID reassignment procedure with the same network.

In some implementations, when the timer T1 expires, the UE may reselect a network and may initiate/trigger the UE ID reassignment procedure with the selected network.

In some implementation, the value of T1 may be pre-defined or configured by core network. The value of T1 may be a NAS parameter.

In some implementations, when the timer T1 expires, the UE may initiate/trigger the UE ID reassignment procedure with a network, either the same network or another network if a triggering event for a new UE ID reassignment procedure happens.

Action #2

In some implementations, when the (multi-SIM) UE determines or detects that a paging collision has happened, the UE may initiate/trigger an offset request procedure. For example, when the multi-SIM UE registers to the Network A and the Network B and determines or detects that a paging collision has happened, the UE may initiate/trigger the offset request procedure with one of the networks (e.g., the Network A or the Network B). In some implementations, when the UE determines or detects that a paging collision has happened, the multi-SIM UE may initiate/trigger the offset request procedure with a selected network among the Network A and the Network B based on at least one of UE implementations, pre-defined rules, configurations, policies from operators, NW commands, network priority, randomly, UE NAS determination, UE AS determination, and supporting the offset request procedure of a network. It should be noted that the UE may only initiate/trigger the offset request procedure with the registered network.

In some implementations, when the UE selects a network related to the 5GS (or 5GC) to initiate/trigger an offset request procedure (e.g., a registration procedure, a UE configuration update procedure, a PDU session establishment procedure, a PDU session modification procedure, or a TAU procedure), the UE (e.g., the NAS layer of the UE, the AS layer of the UE) may not provide the offset as assistance information for the 5GS (or 5GC, or AMF).

In some implementations, when a UE selects a network related to the 5GS (or 5GC) to initiate/trigger an offset request procedure (e.g., a registration procedure, a UE configuration update procedure, a PDU session establishment procedure, a PDU session modification procedure, or a Tracking Area Update procedure), the UE (e.g., the NAS layer of the UE, the AS layer of the UE) may calculate at least one offset (e.g., an offset value based on the current 5G-S-TMSI, an offset index based on the current 5G-S-TMSI, an offset to a paging parameter, an offset to PO, an offset to PF, or an offset to a DRX parameter/cycle) as assistance information for the 5GS (or 5GC, or AMF). The UE may transmit the offset(s) to inform the 5GS (or 5GC, or AMF). The offset(s) may be transmitted via NAS signaling (e.g., a registration request message, a PDU session establishment request message, or a new NAS signaling) or RRC signaling (e.g., an RRC setup request message, an RRC setup complete message, an RRC resume request message, an RRC resume complete message, or a new RRC message). In some implementations, based on the configurations received from the network (e.g., via NAS signaling, dedicated signaling, or broadcasting system information) to the UE via the serving cell, a UE may determine whether to calculate offset(s). In some implementations, based on the configurations received from the network (e.g., via NAS signaling, dedicated signaling, or broadcasting system information), for example, via the serving cell, a UE may determine whether to transmit the offset(s) to the 5GS (or 5GC, or AMF). In some implementations, after determining to calculate the offset(s), the UE may determine whether to transmit the offset(s) to the 5GS (or 5GC, or AMF) based on the configuration received from the network (e.g., via NAS signaling, dedicated signaling, or broadcasting system information). In some implementations, when a UE selects a network related to the 5GS (or 5GC) to initiate/trigger an offset request procedure, the UE may transmit the offset request indication(s) or other assistance information (e.g., paging parameters/PF(s)/PO(s) of another network, or suggested DRX configuration/parameters/cycle) to inform the 5GS (or 5GC). The offset request indication(s) or other assistance information may be transmitted via NAS signaling (e.g., a registration request message, a PDU session establishment request message, or a new NAS signaling) or RRC signaling (e.g., an RRC setup request message, an RRC setup complete message, an RRC resume request message, an RRC resume complete message, or a new RRC message). The 5GS (or 5GC) or the corresponding AMF may respond configured offset(s) to the UE. For example, the UE may transmit the offset(s), offset request indication(s) and/or other assistance information in a Registration Request message. The 5GS (or 5GC) or a corresponding AMF may respond a configured offset in a Registration Accept message to the UE via the serving cell. Note that the offset(s) received from the 5GS (or 5GC) may or may not be the same as the one transmitted/suggested by the UE. In some implementations, the configured offset received from the 5GS (or 5GC) may be used by the UE to update the existing UE ID for the corresponding/selected network stored in the UE (e.g., update the existing UE ID according to the configured offset). That is, the received offset may be used for PF/PO calculation and/or for monitoring the paging record(s) in paging message(s). In some implementations, a configured offset received from the 5GS (or 5GC) may be indicated (or pre-configured) to be used for the PF/PO calculation only and not to be used for monitoring paging record(s) in paging message(s). In some implementations, based on the configurations received from the network (e.g., via NAS signaling, dedicated signaling, or broadcasting system information), a UE may determine whether to transmit offset request indication(s) and/or other assistance information to the 5GS (or 5GC, or AMF).

In some implementations, when the UE selects a network related to the EPS (or EPC) to initiate/trigger an offset request procedure (e.g., a registration procedure, an attach procedure, a UE configuration update procedure, a PDN connectivity procedure, or a Tracking Area Update procedure), the UE may not provide the offset as assistance information for the EPS (or EPC, or MME).

In some implementations, when the UE selects a network related to the EPS (or EPC) to initiate/trigger an offset request procedure (e.g., a registration procedure, an attach procedure, a UE configuration update procedure, a PDN connectivity procedure, or a Tracking Area Update procedure), the UE may calculate at least one offset (e.g., an offset value based on the current UE ID, an offset index based on the current UE ID, an offset to a paging parameter, an offset to PO, an offset to PF, or an offset to a DRX parameter/cycle) as assistance information for the EPS (or EPC, or MME). The UE may transmit the offset(s) to inform the EPS (or EPC, or MME). The offset(s) may be transmitted to EPS via NAS signaling (e.g., an attach request message, a PDU connection request message, or a new NAS signaling) or RRC signaling (e.g., an RRC setup request message, an RRC setup complete message, an RRC resume request message, an RRC resume complete message, or a new RRC message). In some implementations, based on the configurations transmitted from the network (e.g., via the NAS signaling, the dedicated signaling or the broadcasting system information) to the UE via the serving cell, the UE may determine whether to calculate the offset(s). In some implementations, based on the configurations transmitted from the network (e.g., via the NAS signaling, the dedicated signaling or the broadcasting system information) to the UE via the serving cell, the UE may determine whether to transmit the offset(s) to the EPS (or EPC, or MME). In some implementations, after the UE determines to calculate the offset(s), the UE may determine whether to transmit the offset(s) to the EPS (or EPC, or MME) based on the configurations transmitted from the network (e.g., via NAS signaling, dedicated signaling, or broadcasting system information) to the UE via the serving cell. In some implementations, when the UE selects a network related to the EPS (or EPC) to initiate/trigger an offset request procedure, the UE may transmit the offset request indication(s) or other assistance information (e.g., paging parameters/PF(s)/PO(s) of another network, or suggested DRX configuration/parameters/cycle) to inform the EPS (or EPC, or MME). The EPS (or EPC) or the corresponding MME may respond the configured offset(s) to the UE. For example, the UE may transmit to the EPS (or EPC, or MME) a least one of offset(s), offset request indication(s), and other assistance information via the Attach Request message. The EPS (or EPC) or the corresponding MME may respond the offset(s) to the UE via the serving cell in a message, such as the Attach Accept message. Note that, in some examples, the offset(s) received from the EPS (or EPC) may be the same as the one transmitted/suggested by the UE. In some examples, the offset(s) received from the EPS (or EPC) may not be the same as the one transmitted/ suggested by the UE. In some implementations, the configured offset received from the EPS (or EPC) may be used by the UE to update the existing UE ID for the corresponding/ selected network stored in the UE (e.g., update to UE ID with the offset). That is, the received offset may be used for PF/PO calculation and for monitoring paging record(s) in paging message(s). In some implementations, the configured offset received from the EPS (or EPC) may be indicated (or pre-configured) to be used for PF/PO calculation only and not used for monitoring paging record(s) in paging message(s). The offset request indication(s) or other assistance information may be transmitted by the UE via the NAS signaling or the RRC signaling. In some implementations, based on the configurations transmitted from the network (e.g., via the NAS signaling, the dedicated signaling or broadcasting system information), the UE may determine whether to transmit the offset request indication(s) and/or other assistance information to the EPS (or EPC, or MME).

It should be noted that the suggested DRX configuration as previously mentioned may be, but is not limited to, one of the following:
  Cell-level DRX (a DRX value pre-configured at the BS and sent to all UEs in a cell through broadcast messages).
  UE-level DRX (for the calculation of PF and PO by the UE in the RRC_IDLE state, the DRX parameters/ configuration is sent by the core network MME/AMF to the BS, and the BS further transmits the DRX parameters/configuration to the UE).
  RAN-level DRX (for the calculation of PF and PO by the UE in the RRC_INACTIVE state, the DRX parameters/configuration is also sent by the core network to the BS, and the BS further transmits the DRX parameters/configuration to the UE).

In some implementations, when the UE initiates/triggers an offset request procedure, a timer T2 may (re)start. In some implementations, when a value for the timer T2 is reconfigured, the UE may re(start) the timer T2. In some implementations, the UE may (re)start the timer T2 after the offset request procedure is successfully completed. In some implementations, when the timer T2 is running, the UE is prohibited to initiate/trigger another offset request procedure. The UE may maintain, start, restart, or stop the timer T2.

In some implementations, the timer T2 may stop if at least one of the following criteria is satisfied:
(1) The paging collision is resolved.
(2) A cell (re)selection procedure is performed (e.g., a cell (re)selection procedure is performed on the Network A or the Network B).
(3) The selected/registered PLMN is changed.
(4) The selected RAT is changed (e.g., the selected RAT of the Network A or the Network B is changed).
(5) The NAS layer of the UE switches to the SNPN access mode (or the SNPN access mode is activated).
(6) The associated CN type is changed (e.g., the associated CN type of the Network A or the Network B is changed).
(7) The multi-SIM operation status is changed (e.g., the multi-SIM operation is switched to "OFF").
(8) The UE receives a new offset.
(9) The UE receives the response from network.
(10) The value of the timer T2 is reconfigured.
(11) The UE leaves a valid area.
(12) RRC state transitions (e.g., while the UE moves to the RRC Connected state or while the UE moves to the RRC idle state)
(13) De-registered from one network.
(14) UE's status (e.g., paging reception status) on the Network B changes if the selected network is the Network A. For example, the UE ID associated with the Network B has been changed by the Network B.
(15) The UE ID reassignment procedure is successfully completed.
(16) The UE ID reassignment procedure fails (e.g., a NW rejection message is received).
(17) The UE receives a new UE ID from the core network via the serving cell.

In some implementations, if the paging collision is resolved, the UE may abort the initiated/triggered/ongoing offset request procedure (e.g., a registration procedure, an attach procedure, a UE configuration update procedure, a PDU session establishment procedure, a PDU connectivity procedure, or a TAU procedure). In some implementations, the UE may inform the associated core network (e.g., EPC or 5GC), via the serving cell, that the initiated/triggered/ongoing UE ID reassignment procedure is aborted (e.g., via NAS message).

In some implementations, if a cell (re)selection procedure is performed, the UE may abort the initiated/triggered/ongoing offset request procedure (e.g., a registration procedure, an attach procedure, a UE configuration update procedure, a PDU session establishment procedure, a PDU connectivity procedure, or a TAU procedure). The UE (e.g., a lower layer of the UE, such as the AS/RRC layer) may inform, the upper layer (e.g., the NAS layer) that a cell (re)selection procedure is performed. The NAS layer of the UE may abort the initiated/triggered offset request procedure when the NAS layer of the UE is informed that a cell (re)selection procedure is performed. After the UE (re) selects a new camped cell (e.g., a suitable cell, an acceptable cell) (or when the cell (re)selection procedure) is completed, the (multi-SIM) UE (or the UE with multi-SIM status "ON") may determine if any paging collision event happens again.

In some implementations, if the multi-SIM operation status is changed (e.g., the multi-SIM operation is switched to "OFF"), the UE may abort the initiated/triggered/ongoing offset request procedure (e.g., a registration procedure, an attach procedure, a UE configuration update procedure, a PDU session establishment procedure, a PDU connectivity procedure, or a TAU procedure).

In some implementations, if the selected/registered PLMN is changed, the selected RAT is changed, the associated CN type is changed, UE's RRC state is changed, SNPN access mode is switched, or de-registering from the selected network, the UE may abort the initiated/triggered/ ongoing offset request procedure (e.g., a registration procedure, an attach procedure, a UE configuration update procedure, a PDU session establishment procedure, a PDU connectivity procedure, or a TAU procedure).

In some implementations, if the UE leaves a valid area, the UE may abort the initiated/triggered/ongoing offset request procedure (e.g., a registration procedure, an attach procedure, a UE configuration update procedure, a PDU session establishment procedure, a PDU connectivity procedure, or a TAU procedure). The valid area may be configured by the network. The valid area may be a tracking area, a RAN notification area, or a system information area, or any other area configured by the network.

In some implementations, if the initiated/triggered/ongoing offset request procedure is aborted by the upper layer (e.g., NAS layer) of the UE, the UE may inform the lower layer (e.g., the AS layer or the RRC layer) to stop/suspend the setup/resume of the connection to the network (or a BS). For example, if an RRC connection procedure (or a RRC resume procedure) is ongoing for initiating/triggering the offset request procedure and the multi-SIM operation is switched to be "OFF", the NAS layer of the UE may abort the initiated/triggered/ongoing offset request procedure and may inform the RRC layer (or AS layer) of the UE to stop/suspend the RRC connection procedure (or the RRC resume procedure) accordingly.

In some implementations, when the timer T2 expires, the UE may initiate/trigger the offset request procedure with another network.

In some implementations, when the timer T2 expires, the UE may initiate/trigger the offset request procedure with the same network.

In some implementations, when the timer T2 expires, the UE may reselect a network and may initiate/trigger the offset request procedure with the selected network.

In some implementation, the value of T2 may be predefined or configured by core network. The value of T2 may be a NAS parameter.

In some implementations, when the timer T2 expires, the UE may initiate/trigger the offset request procedure with a network, either the same network or another network if a triggering event for a new offset request procedure happens.

Action #3

In some implementations, when the (multi-SIM) UE determines or detects that a paging collision has happened, the (multi-SIM) UE may initiate/trigger a consecutive PO request procedure. For example, the multi-SIM UE registers to the Network A and Network B, the UE may initiate/trigger the consecutive PO request procedure with one of the networks (e.g., the Network A or the Network B). In some implementations, when the (multi-SIM) UE determines or detects that a paging collision has happened, the (multi- SIM) UE may initiate/trigger a consecutive PO request to the selected network among the Network A and the Network B based on at least one of UE implementations, pre-defined rules, configurations, policies from operators, NW commands, network priority, randomly, UE NAS determination, UE AS determination, and supporting the UE ID reassignment procedure of a network. Note that, the UE may only initiate/trigger the consecutive PO request procedure with the registered network. In some implementations, the UE may transmit the consecutive PO request message to the selected network via the NAS signaling or the RRC signaling. In some implementations, when the UE receives a response from the selected/registered network (e.g., via the serving cell), the UE may start monitoring the additional PO(s) for the paging occasions. The additional PO(s) may be configured by dedicated signaling (e.g., an RRC message or a NAS message) or be configured via system information (e.g., received from the serving cell). In some implementations, the additional PO(s) may only be associated with a collided PO. For example, for a UE in the IDLE state, the MME/AMF sends, to RAN, the first attempt of paging with existing Paging Attempt IE set to '1' in the PAGING message. Then, the RAN pages the UE. If the MME/AMF does not receive the response from the UE, the MME/AMF may send, to RAN, the second attempt of paging with Paging Attempt Count set to '2'. The RAN pages the UE on the consecutive POs. The consecutive POs may be pre-configured by the serving BS. For example, for a UE in the INACTIVE state, the serving RAN node sends the first attempt of paging with Paging Attempt Count set to '1' to the RAN nodes within the RNA of the UE. The RAN nodes within the RNA of the UE may page the UE without repetitions. If the UE does not respond, the serving RAN node may send the second attempt of paging with Paging Attempt Count set to '2' to the RAN nodes within the RNA of the UE. The RAN nodes within the RNA of the UE may page the UE on the consecutive POs. Note that the consecutive POs may be pre-configured by the serving BS.

Inter-Layer Interaction

In some implementations, the upper layer of the UE (e.g., the NAS layer) may inform the lower layer of the UE (e.g., the RRC layer or the AS layer) whether the multi-SIM operation of the UE is "ON" (or "OFF"). In some implementations, if the lower layer of the UE is informed by the upper layer of the UE that the multi-SIM operation of the UE is "ON", the lower layer of the UE may start performing the paging collision determination (or the paging collision detection). In some implementations, if the lower layer of the UE is informed by the upper layer of the UE that the multi-SIM operation of the UE is "OFF", the lower layer of the UE may stop performing the paging collision determination (or the paging collision detection).

In some implementations, the upper layer of the UE (e.g., the NAS layer) may inform the lower layer of the UE (which action(s) (e.g., the above-mentioned actions #1, #2, and #3) may be taken (or is allowed/configured to be taken) to resolve the paging collision(s). Based on the allowed/configured action(s) to be taken, the lower layer of the UE may determine which information is required to inform the upper layer of the UE (e.g., the NAS layer) when the UE determines or detects that the paging collision has happened. In some examples, if Action #1 is allowed/configured, the lower layer of the UE may provide a new UE ID to the upper layer of the UE when the UE determines or detects that a paging collision has happened. In some examples, if Action #2 is allowed/configured, the lower layer of the UE may provide at least one offset to the upper layer of the UE (e.g., the NAS layer) when the UE determines or detects that the paging collision happens.

In some implementations, when the UE determines or detects that a paging collision has happened, the lower layer of the UE (e.g., the RRC layer or the AS layer) may inform the upper layer of the UE (e.g., the NAS layer) that a paging collision has happened (or is detected). Accordingly, the upper layer of the UE may transmit an indication (e.g., for indicating that a paging collision has happened (or is detected)) to the selected network (e.g., via the NAS signaling) for the paging collision resolution.

In some implementations, when the UE determines or detects that a paging collision has happened, the lower layer of the UE may transmit, to the upper layer of the UE (e.g., NAS layer), an indication to indicate that a paging collision has happened (or is detected). Accordingly, the upper layer of the UE may determine an action (e.g., Action #1, Action #2, or Action #3) to resolve the paging collision. In some implementations, after the lower layer of the UE transmits the indication to indicate that a paging collision has happened (or is detected) to the upper layer of the UE, the RRC entity (or the AS layer) of the UE associated with the impacted network (or the selected network) may suspend/stop monitoring all PF(s)/PO(s) or suspend/stop monitoring collided PF(s)/PO(s). In some implementations, after the lower layer of the UE transmits the indication to indicate that a paging collision has happened (or is detected) to the upper layer of the UE, all RRC entities (or all AS layers) may suspend/stop monitoring all PF(s)/PO(s) until resuming paging reception instructed by the upper layer of the UE. In some implementations, after the lower layer of the UE transmits the indication to indicate that a paging collision has happened (or is detected) to the upper layer of the UE, all RRC entities (or all AS layers) may keep monitoring all PF(s)/PO(s). For collided PF(s)/PO(s), the UE may randomly select one of the networks for the paging reception. For collided PF(s)/PO(s), the UE may randomly select one network with high priority for the paging reception. The priority may be pre-configured, pre-defined, or based on UE implementation. The priority rule may be pre-configured/pre-defined in technical specification, may be pre-installed in USIM, or may depend on the input associated with another involved NW. When the upper layer of the UE (e.g., the NAS layer) receives the indication to indicate that a paging collision has happened (or is detected) from the lower layer of the UE (e.g., the RRC layer or the AS layer), the upper layer of the UE (e.g., the NAS layer) may indicate to an RRC entity (or an AS layer) to suspend/stop monitoring all PF(s)/PO(s) or suspend/stop monitoring collided PF(s)/PO(s). The RRC entity (or the AS layer) may be associated with the impacted network (or selected network). When the upper layer of the UE (e.g., the NAS layer) receives the indication to indicate that a paging collision has happened (or is detected) from the lower layer of the UE (e.g., the RRC layer or the AS layer), the upper layer of the UE (e.g., the NAS layer) may indicate to an RRC entity (or an AS layer) to resume/start monitoring all PF(s)/PO(s) or resume/start monitoring collided PF(s)/PO(s). The RRC entity (or the AS layer) may be associated with the impacted network (or selected network).

In some implementations, when the UE determines or detects that a paging collision has happened, based on the action (e.g., Action #1, Action #2, or Action #3) to be taken for the paging collision resolution, the lower layer of the UE (e.g., the RRC layer or the AS layer) may provide the assistance information to the upper layer of the UE (e.g., the NAS layer). The assistance information may include, but is not limited to, paging parameters/PF(s)/PO(s) of another network, or suggested DRX configuration/parameters/cycle. A type of assistance information required to be reported to the upper layer of the UE may be determined based on at least one of the actions (Action #1, Action #2, or Action #3) to be taken, type of the selected RAT (e.g., LET or NR), type of the selected network/core network (e.g., EPC or 5GC), and configuration/instruction received from the network(s). The upper layer of the UE may transmit the assistance information to the selected network (e.g., via the NAS signaling) for the paging collision resolution.

In some implementations, after the upper layer of the UE (e.g., the NAS layer) transmits the indication and/or the assistance information to the selected network (e.g., via the NAS signaling) for the paging collision resolution, the upper layer of the UE may receive a network configuration/instruction that includes paging related parameter(s) (e.g., DRX parameter(s)). Accordingly, the upper layer of the UE may transmit the received paging related parameter(s) to the lower layer of the UE, and thus the UE may perform the paging reception on the impacted network (or the selected network) based on the received paging related parameter(s). The received paging related parameter(s) may be released/suspended (or not applied) for the paging reception if at least one of the following criteria is satisfied:

(1) Successful handover to another cell (e.g., the UE is connected to a new target cell of the impacted/selected network).
(2) (re)selecting a cell of the impacted/selected network to camp (e.g., in the RRC_IDLE state or in the RRC_INACITVE state).
(3) (re)selecting a cell of the non-impacted/non-selected network to camp (e.g., in the RRC_IDLE state or in the RRC_INACITVE state).
(4) Determining a new paging collision event happens.
(5) A Mobility Registration Update procedure is initiated.
(6) The multi-SIM operation status is changed (e.g., the multi-SIM operation is switched to "OFF").
(7) A timer T3 expires:
(7a) The value of the timer T3 may be a fixed value or be configured by the network via dedicate signaling or broadcasting system information.
(7b) The value of the timer T3 may be provided by a network command. For example, a core network may provide paging related parameter(s) together with the timer T3 in an NAS signaling.
(7c) When the UE receives the network command including paging related parameter(s) and the timer T3, the UE may start the timer T3.
(7d) The UE may keep using/applying the received paging related parameter(s) when the timer T3 is running.
(8) The UE leaves a valid area (e.g., a tracking area, a RAN notification area, or a system information area, or any other area configured by the network).
(8a) In some implementations, the UE may keep using/applying the received paging related parameter(s) within an area.
(9) The selected PLMN is changed.
(10) The selected RAT is changed.
(11) The associated CN type is changed.
(12) The UE receives new paging parameter(s)/configuration from the registered/selected network.
(13) The UE is re-directed to another AMF/MME.
(14) The UE is de-registered from one network (e.g., the Network A or the Network B).
(15) The UE receives a network command/instruction to release/suspend the received paging related parameter(s).

In some implementations, if the received paging related parameter(s) is released/suspended (or not applied) for the paging reception, the UE may calculate PF(s)/PO(s) based on the previous paging parameter(s) (e.g., the paging parameter(s) broadcasting in system information).

In some implementations, after the lower layer of the UE (e.g., the RRC layer or the AS layer) transmits the assistance information to indicate that a paging collision has happened (or is detected) to the upper layer of the UE (e.g., the NAS layer), the RRC entity (or the AS layer) associated with the impacted network (or the selected network) may suspend/stop monitoring all PF(s)/PO(s) or suspend/stop monitoring collided PF(s)/PO(s). In some implementations, after the lower layer of the UE transmits the assistance information to indicate that a paging collision has happened (or is detected) to the upper layer of the UE, all RRC entities (or all AS layers) may suspend/stop monitoring all PF(s)/PO(s) until resuming paging reception is instructed by the upper layer of the UE. In some implementations, after the lower layer of the UE (e.g., the RRC layer or the AS layer) transmits the assistance information to indicate that a paging collision has happened (or is detected) to the upper layer of the UE, all RRC entities (or all AS layers) may keep monitoring all PF(s)/PO(s). For collided PF(s)/PO(s), the UE may randomly select one of the networks for the paging reception. For collided PF(s)/PO(s), the UE may randomly select one network with high priority for the paging reception. The priority may be pre-configured, pre-defined, or based on UE implementation. The priority rule may be pre-configured/pre-defined in the 3GPP technical specification, may be pre-installed in USIM, or may depend on the input associated with another involved network. When the upper layer of the UE (e.g., the NAS layer) receives the assistance information to indicate that a paging collision has happened (or is detected) from the lower layer of the UE (e.g., the RRC layer or the AS layer), the upper layer of the UE (e.g., the NAS layer) may indicate to an RRC entity (or an AS layer) to suspend/stop monitoring all PF(s)/PO(s) or suspend/stop monitoring collided PF(s)/PO(s). The RRC entity (or the AS layer) may be associated with the impacted network (or selected network). When the upper layer of the UE (e.g., the NAS layer) receives the assistance information to indicate that a paging collision has happened (or is detected) from the lower layer of the UE (e.g., the RRC layer or the AS layer), the upper layer of the UE (e.g., the NAS layer) may indicate to an RRC entity (or an AS layer) to resume/start monitoring all PF(s)/PO(s) or resume/start monitoring collided PF(s)/PO(s). The RRC entity (or the AS layer) may be associated with the impacted network (or selected network).

In some implementations, when the UE determines or detects that a paging collision has happened, based on the previously mentioned actions to be taken for the paging collision resolution, the lower layer of the UE (e.g., the RRC layer or the AS layer) may report at least one new UE ID to the upper layer of the UE (e.g., the NAS layer). Accordingly, the upper layer of the UE (e.g., the NAS layer) may initiate/trigger the UE ID reassignment procedure by sending a UE ID reassignment request message including at least one new UE ID and/or other assistance information.

In some implementations, after the upper layer of the UE (e.g., the NAS layer) sends the UE ID reassignment request message including at least one new UE ID and/or other assistance information to the selected network (e.g., via the NAS signaling) for the paging collision resolution, the upper layer of the UE may receive the network configuration/instruction including at least one new UE ID. Accordingly, the upper layer of the UE may transmit the at least one received UE ID to the lower layer of the UE and the UE may perform the paging reception on the impacted network (or the selected network) based on at least one received UE ID. The at least one received UE ID may be released/suspended (or not applied) for the paging reception if at least one of the following criteria is satisfied:

(1) Successful handover to another cell (e.g., the UE is connected to a new target cell of the impacted/selected network).
(2) (re)selecting a cell of the impacted/selected network to camp (e.g., in the RRC_IDLE state or in the RRC_INACITVE state).
(3) (re)selecting a cell of the non-impacted/non-selected network to camp (e.g., in the RRC_IDLE state or in the RRC_INACITVE state).
(4) Determining a new paging collision event happens.
(5) A Mobility Registration Update procedure is initiated.
(6) The multi-SIM operation status is changed (e.g., the multi-SIM operation is switched to "OFF").
(7) A timer T4 expires:
(7a) The value of the timer T4 may be a fixed value or be configured by the network via the dedicate signaling or the broadcasting system information.
(7b) The value of the timer T4 may be provided by a network command. For example, a core network may provide at least one new UE ID together with the timer T4 in an NAS signaling.
(7c) When the UE receives the network command including at least one new UE ID and the timer T4, the UE may start the timer T4.
(7d) The UE may keep using/applying the received UE ID when the timer T4 is running.
(8) The UE leaves a valid area (e.g., a tracking area, a RAN notification area, or a system information area, or any other area configured by the network.)
(8a) In some implementations, the UE may keep using/applying the received UE ID within an area.
(9) The selected PLMN is changed.
(10) The selected RAT is changed.
(11) The associated CN type is changed.
(12) The UE receives a UE ID from the registered/selected network.
(13) The UE is re-directed to another AMF/MME.
(14) The UE is de-registered from one network (e.g., the Network A or the Network B).
(15) The UE receives a network command/instruction to release/suspend the received UE ID.

In some implementations, if the at least one received UE ID is released/suspended (or not applied) for the paging reception, the UE may calculate PF(s)/PO(s) based on the previous UE ID. In some implementations, the UE may store the previous UE ID, even when at least one UE ID is received for the paging collision resolution.

In some implementations, after the lower layer of the UE (e.g., the RRC layer or the AS layer) transmits at least one new UE ID to indicate that a paging collision has happened (or is detected) to the upper layer of the UE (e.g., the NAS layer), the RRC entity (or the AS layer) associated with the impacted network (or the selected network) may suspend/stop monitoring all PF(s)/PO(s) or suspend/stop monitoring collided PF(s)/PO(s). In some implementations, after the lower layer of the UE (e.g., the RRC layer or the AS layer) transmits at least one new UE ID to indicate that a paging collision has happened (or is detected) to the upper layer of the UE (e.g., the NAS layer), all the RRC entities (or all the AS layers) may suspend/stop monitoring all PF(s)/PO(s) until resuming paging reception instructed by the upper layer of the UE. In some implementations, after the lower layer of the UE (e.g., the RRC layer or the AS layer) transmits at least one new UE ID to indicate that a paging collision has happened (or is detected) to the upper layer of the UE (e.g., NAS layer), all the RRC entities (or all the AS layers) may keep monitoring all PF(s)/PO(s). For collided PF(s)/PO(s), the UE may randomly select one of the networks for paging reception. For collided PF(s)/PO(s), the UE may randomly select one network with high priority for the paging reception. The priority may be pre-configured, pre-defined, or based on UE implementation. The priority rule may be pre-configured/pre-defined in the 3GPP technical specification, may be pre-installed in USIM, or may depend on the input associated with another involved network. When the upper layer of the UE (e.g., NAS layer) receives at least one new UE ID to indicate that a paging collision has happened (or is detected) from the lower layer(s) of the UE (e.g., RRC layer or AS layer), the upper layer of the UE (e.g., NAS layer) may indicate to an RRC entity (or an AS layer) to suspend/stop monitoring all PF(s)/PO(s) or suspend/stop monitoring collided PF(s)/PO(s). The RRC entity (or the AS layer) may be associated with the impacted network (or selected network). When the upper layer of the UE (e.g., NAS layer) receives at least one new UE ID to indicate that a paging collision has happened (or is detected) from the lower layer of the UE (e.g., the RRC layer or the AS layer), the upper layer of the UE (e.g., the NAS layer) may indicate to an RRC entity (or an AS layer) to resume/start monitoring all PF(s)/PO(s) or resume/start monitoring collided PF(s)/PO(s). The RRC entity (or the AS layer) may be associated with the impacted network (or selected network).

In some implementations, when the UE determines or detects that a paging collision has happened, based on the previously mentioned actions to be taken for the paging collision resolution, the lower layer of the UE (e.g., the RRC layer or the AS layer) may report at least one offset (or offset index) to the upper layer of the UE (e.g., the NAS layer). Accordingly, the upper layer of the UE (e.g., the NAS layer) may initiate/trigger an offset request procedure by sending an offset request message including at least one offset (or offset index) and/or another assistance information.

In some implementations, after the upper layer of the UE (e.g., the NAS layer) sends an offset request message including at least one offset (or offset index) and/or another assistance information to the selected network (e.g., via the NAS signaling) for the paging collision resolution, the upper layer of the UE may receive a network configuration/instruction including at least one offset (or offset index). Accordingly, the upper layer of the UE may transmit/forward/deliver the at least one received offset (or offset index) to lower layer(s) of the UE and the UE may perform paging reception on the impacted network (or the selected network) based on at least one received offset (or offset index). The at least one received offset (or offset index) may be released/suspended (or not applied) for the paging reception if at least one of the following criteria is satisfied:

(1) Successful handover to another cell (e.g., the UE is connected to a new target cell of the impacted/selected network).
(2) (re)selecting a cell of the impacted/selected network to camp (e.g., in the RRC_IDLE state or in the RRC_INACITVE state).

(3) (re)selecting a cell of the non-impacted/non-selected network to camp (e.g., in the RRC_IDLE state or in the RRC_INACITVE state).
(4) Determining a new paging collision event happens.
(5) A Mobility Registration Update procedure is initiated.
(6) The multi-SIM operation status is changed (e.g., the multi-SIM operation is switched to OFF).
(7) A timer T5 expires:
(7a) The value of the timer T5 may be a fixed value or be configured by the network via the dedicate signaling or the broadcasting system information.
(7b) The value of the timer T5 may be provided by a network command. For example, a core network may provide at least one offset (or offset index) together with the timer T5 in an NAS signaling.
(7c) When the UE receives the network command including at least one offset (or offset index) and the timer T5, the UE may start the timer T5.
(7d) The UE may keep using/applying the received offset (or offset ID) when the timer T5 is running.
(8) The UE leaves a valid area (e.g., a tracking area, a RAN notification area, or a system information area, or any other area configured by the network).
(8a) In some implementations, the UE may keep using/applying the received UE ID within an area.
(9) The selected PLMN is changed.
(10) The selected RAT is changed.
(11) The associated CN type is changed.
(12) The UE receives an offset (or offset index) from the registered/selected network.
(13) The UE is re-directed to another AMF/MME.
(14) The UE is de-registered from one network (e.g., the Network A or the Network B).
(15) The UE receives a network command/instruction to release/suspend the received offset (or offset index).

In some implementations, if the at least one received offset (or offset index) is released/suspended (or not applied) for the paging reception, the UE may calculate PF(s)/PO(s) based on the previous UE ID. In some implementations, the UE may store the previous UE ID, even when at least one offset (or offset index) is received for the paging collision resolution.

In some implementations, after the lower layer of the UE (e.g., RRC layer or AS layer) transmits at least one offset (or offset index) to indicate that a paging collision has happened (or is detected) to the upper layer of the UE (e.g., NAS layer), the RRC entity (or the AS layer) associated with the impacted network (or the selected network) may suspend/stop monitoring all PF(s)/PO(s) or suspend/stop monitoring collided PF(s)/PO(s). In some implementations, after the lower layer of the UE (e.g., RRC layer or AS layer) transmits at least one offset (or offset index) to indicate that a paging collision has happened (or is detected) to the upper layer of the UE (e.g., the NAS layer), all the RRC entities (or all the AS layers) may suspend/stop monitoring all PF(s)/PO(s) until resuming paging reception instructed by the upper layer of the UE. In some implementations, after the lower layer of the UE (e.g., RRC layer or AS layer) transmits at least one offset (or offset index) to indicate that a paging collision has happened (or is detected) to the upper layer of the UE (e.g., the NAS layer), all the RRC entities (or all the AS layers) may keep monitoring all PF(s)/PO(s). For collided PF(s)/PO(s), the UE may randomly select one of the networks for the paging reception. For collided PF(s)/PO(s), the UE may randomly select one network with high priority for the paging reception. The priority may be pre-configured, pre-defined, or based on UE implementation. The priority rule may be pre-configured/pre-defined in the 3GPP technical specification, may be pre-installed in USIM, or may depends on the input associated with another involved network. When the upper layer of the UE (e.g., NAS layer) receives at least one offset (or offset index) to indicate that a paging collision has happened (or is detected) from the lower layer(s) of the UE (e.g., the RRC layer or the AS layer), the upper layer(s) of the UE (e.g., the NAS layer) may indicate to an RRC entity (or an AS layer) to suspend/stop monitoring all PF(s)/PO(s) or suspend/stop monitoring collided PF(s)/PO(s). The RRC entity (or the AS layer) may be associated with the impacted network (or selected network). When the upper layer of the UE (e.g., NAS layer) receives at least one offset (or offset index) to indicate that a paging collision has happened (or is detected) from the lower layer of the UE (e.g., the RRC layer or the AS layer), the upper layer of the UE (e.g., the NAS layer) may indicate to an RRC entity (or an AS layer) to resume/start monitoring all PF(s)/PO(s) or resume/start monitoring collided PF(s)/PO(s). The RRC entity (or the AS layer) may be associated with the impacted network (or selected network).

In some implementations, the RRC layer may provide the following services to the upper layer (e.g., the NAS layer):
1. Broadcast of common control information;
2. Notification of UEs in the RRC_IDLE (e.g., about a mobile terminating call);
3. Notification of UEs about ETWS and/or CMAS;
4. Transfer of dedicated signaling;
5. Broadcast of positioning assistance data;
6. Notification of paging collision (e.g., when the multi-SIM operation is activated).

In some implementations, the NAS layer of the UE may request the AS layer of a UE to initiate an RRC connection setup/resume procedure for the paging collision resolution.

For transmission of RRC Setup Request, the UE may set the establishment cause in accordance with the information received from the upper layer. For example, the (AS layer of) UE may receive information related to paging collision resolution from the upper layer. Accordingly, the UE may set the establishment cause as "paging collusion resolution" in an RRC setup request message. In some implementations, the UE may set the establishment cause as "others" in an RRC setup request message if the setup procedure is caused by paging collision resolution.

For transmission of RRC Resume Request, the UE may set the resume cause in accordance with the information received from the upper layer. For example, the (AS layer of) UE may receive information related to paging collision resolution from the upper layers. Accordingly, the UE may set the resume cause as "paging collusion resolution" in an RRC resume request message. In some implementations, the UE may set the resume cause as "others" in an RRC resume request message if the resume procedure is caused by paging collision resolution.

In some implementations, the NAS layer of the UE may request the AS layer of the UE to initiate an RRC connection release procedure when paging collision resolution is complete (or failed). For example, if a UE ID reassignment procedure, an offset request procedure or a consecutive PO request procedure is successfully completed (or failed), the NAS layer of the UE may request the AS layer of the UE to initiate an RRC connection release procedure.

Figure 2:
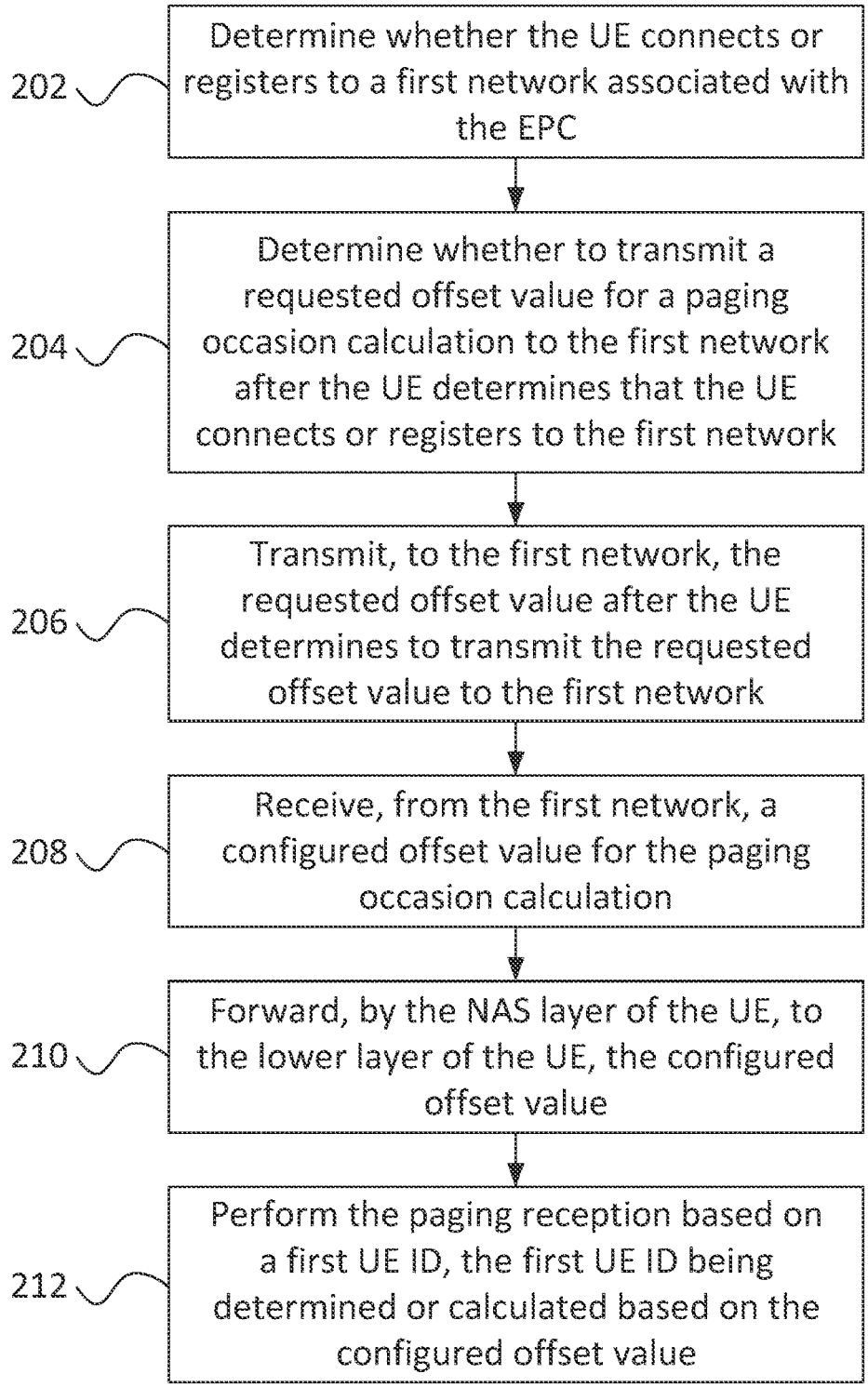
FIG. 2 is a flowchart illustrating a method for performing a paging reception, according to an implementation of the present disclosure.

FIG. 2 is a flowchart illustrating a method/process 200 for performing a paging reception, according to an implementation of the present disclosure. In action 202, the UE determines whether the UE connects or registers to a first network associated with the EPC. In action 204, the UE determines whether to transmit a requested offset value (e.g., an offset value based on the current UE ID (e.g., the current IMSI), an offset index based on the current UE ID, an offset to a paging parameter, an offset to PO, an offset to PF, or an offset to a DRX parameter/cycle) for a paging occasion calculation to the first network after the UE determines that the UE connects or registers to the first network. In action 206, the UE transmits, to the first network, the requested offset value after the UE determines to transmit the requested offset value to the first network. That is, the UE transmits the requested offset value as the assistance information to the EPC or MME, so that the EPC or MME may respond a configured offset value. In action 208, the UE receives, from the first network, a configured offset value for the paging occasion calculation. In action 210, the NAS layer of the UE forwards, to the lower layer of the UE, the configured offset value. In action 212, the UE performs the paging reception based on a first UE ID, the first UE ID being determined or calculated based on the configured offset value. In other words, the UE updates its existing UE ID (e.g., the current IMSI) according to the configured offset value, to generate the first UE ID (e.g., the new IMSI).

In some examples, the UE is a multi-USIM capable UE.

In some examples, the requested offset value and the configured offset value are different.

In some examples, the requested offset value and the configured offset value are the same.

In some examples, the UE further determines whether the UE receives, from the first network, a signal indicating that the first network supports of receiving the requested offset value. Specifically, the UE determines whether to transmit the requested offset value to the first network after the UE determines that the UE receives, from the first network, the signal.

In some examples, the UE transmits the requested offset value to the first network via a TAU procedure (e.g., the tracking area update request message) or via an attach procedure (e.g., the attach request message). On the other hand, the UE receives the configured offset value from the first network via the tracking area update accept message or the attach accept message.

In some examples, the UE further determines whether the UE connects or registers to a second network (e.g., the AMF) associated with the 5GC. The UE determines whether to initiate a UE ID reassignment procedure (e.g., to request a new 5G-GUTI, a new 5G-S-TMSI, or a new IMSI) to the second network after the UE determines that the UE connects or registers to the second network. The UE receives, from the second network, a second UE ID (e.g., 5G-S-TMSI) via the UE ID reassignment procedure after the UE determines to initiate the UE ID reassignment procedure. The NAS layer of the UE forwards, to the lower layer of the UE, the second UE ID. Thus, the UE performs the paging reception based on the second UE ID.

In some examples, the UE further determines whether a paging occasion collision happens when the UE connects or registers to both of the first network and the second network. Moreover, the UE determines whether to transmit the second UE ID to the second network after the UE determines that the paging occasion collision happens.

In some examples, the UE further determines whether the UE connects or registers to a third network associated with the 5GC after the UE determines that the UE connects or registers to the second network. The UE determines whether to initiate the UE ID reassignment procedure with the third network after the UE determines that the UE connects or registers to the third network. The UE receives, from the third network, a third UE ID via the UE ID reassignment procedure after the UE determines to initiate the UE ID reassignment procedure. The NAS layer of the UE forwarding, to the lower layer of the UE, the third UE ID. Thus, the UE performs the paging reception based on the third UE ID.

In some examples, the UE further determines whether a paging occasion collision happens when the UE connects or registers to the first network and a second network. Specifically, the UE determines whether to transmit the requested offset value to the first network after the UE determines that the paging occasion collision happens.

Figure 3:
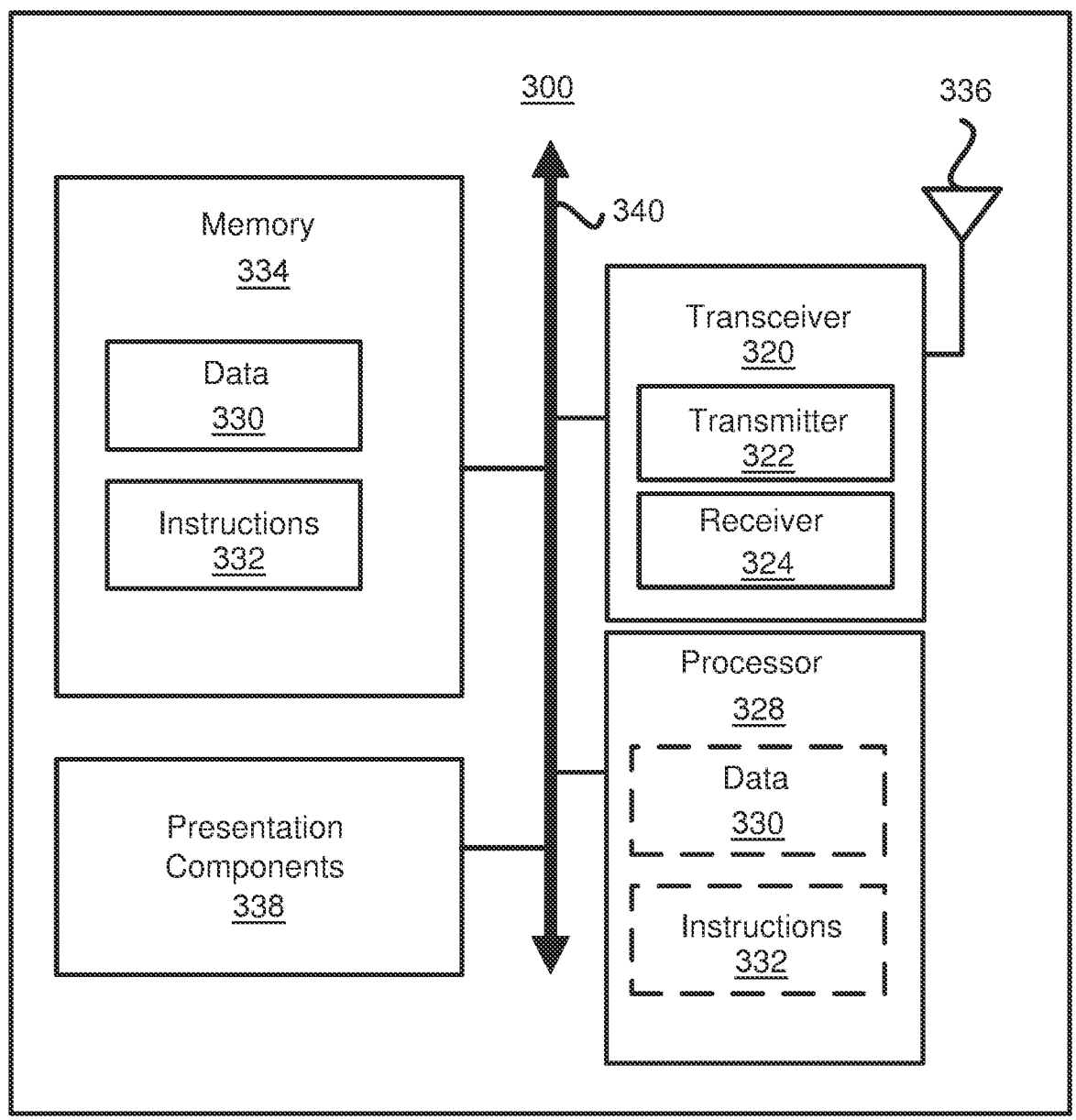
FIG. 3 is a block diagram illustrating a node for wireless communication, according to an implementation of the present disclosure.

FIG. 3 is a block diagram illustrating a node 300 for wireless communication, according to an implementation of the present disclosure.

As illustrated in FIG. 3, the node 300 may include a transceiver 320, a processor 326, a memory 328, one or more presentation components 334, and at least one antenna 336. The node 300 may also include a Radio Frequency (RF) spectrum band module, a BS communications module, a network communications module, a system communications management module, input/output (I/O) ports, I/O components, and a power supply (not illustrated in FIG. 3).

Each of these components may be in communication with each other, directly or indirectly, over one or more buses 340. The node 300 may be a UE or a BS that performs various disclosed functions illustrated in FIG. 2 and examples/implementations in this disclosure.

The transceiver 320 may include a transmitter 322 (with transmitting circuitry) and a receiver 324 (with receiving circuitry) and may be configured to transmit and/or receive time and/or frequency resource partitioning information. The transceiver 320 may be configured to transmit in different types of subframes and slots including, but not limited to, usable, non-usable and flexibly usable subframes and slot formats. The transceiver 320 may be configured to receive data and control channels.

The node 300 may include a variety of computer-readable media. Computer-readable media may be any media that can be accessed by the node 300 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the disclosed media should be included within the scope of computer-readable media.

The memory 328 may include computer-storage media in the form of volatile and/or non-volatile memory. The memory 328 may be removable, non-removable, or a combination thereof. For example, the memory 328 may include solid-state memory, hard drives, optical-disc drives, etc. As illustrated in FIG. 3, the memory 328 may store computer-readable and/or computer-executable instructions 332 (e.g., software codes) that are configured to, when executed, cause the processor 326 (e.g., processing circuitry) to perform various disclosed functions. Alternatively, the instructions 332 may not be directly executable by the processor 326 but may be configured to cause the node 300 (e.g., when compiled and executed) to perform various disclosed functions.

The processor 326 may include an intelligent hardware device, a central processing unit (CPU), a microcontroller, an ASIC, etc. The processor 326 may include memory. The processor 326 may process the data 330 and the instructions 332 received from the memory 328, and information received through the transceiver 320, the baseband communications module, and/or the network communications module. The processor 326 may also process information sent to the transceiver 320 for transmission via the antenna 336, and/or to the network communications module for transmission to a CN.

One or more presentation components 334 may present data to a person or other devices. Presentation components 334 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method for a user equipment (UE) for performing a paging reception, the method comprising:
   registering to a first network comprising an Evolved Packet Core (EPC) network and a second network comprising a 5G core (5GC) network using a first Universal Subscriber Identity Module (USIM) and a second USIM, respectively;
   selecting one of the first network and the second network to prevent a paging collision on the first network and the second network;
   when the first network is selected:
       determining, based on a current UE identity (ID), an offset value for a paging occasion calculation;
       transmitting, by the first USIM, to the first network, the offset value via a tracking area update procedure or via an attach procedure;
       receiving, by the first USIM, from the first network, a configured offset value for the paging occasion calculation;
       forwarding, by a Non-Access-Stratum (NAS) layer of the UE, to a lower layer of the UE, the configured offset value;
       determining a first UE ID based on the configured offset value; and
       performing the paging reception based on the first UE ID; and
   when the second network is selected:
       initiating a UE ID reassignment procedure with the second network, the UE ID reassignment procedure comprising a registration procedure;
       receiving, by the second USIM, from an Access and Mobility Management Function (AMF) of the second network, a second UE ID via the UE ID reassignment procedure;
       forwarding, by the NAS layer of the UE, to the lower layer of the UE, the second UE ID; and
       performing the paging reception based on the second UE ID.

2. The method of claim 1, wherein the offset value and the configured offset value are different.

3. The method of claim 1, wherein the offset value and the configured offset value are the same.

4. The method of claim 1, further comprising, before transmitting, to the first network, the offset value:
   receiving, from the first network, a signal indicating that the first network supports receiving the offset value.

5. The method of claim 1, further comprising:
   registering to a third network comprising the 5GC network by a third USIM;
   determining to initiate the UE ID reassignment procedure with the third network;
   receiving, by the third USIM, from the third network, a third UE ID via the UE ID reassignment procedure after the UE determines to initiate the UE ID reassignment procedure;
   forwarding, by the NAS layer of the UE, to the lower layer of the UE, the third UE ID; and
   performing the paging reception based on the third UE ID.

6. The method of claim 1, further comprising, before transmitting, to the first network, the offset value:
   determining that a paging occasion collision has occurred when the UE registers to the first network and the second network.

7. A user equipment (UE) for performing a paging reception, the UE comprising:
   a processor for executing a computer-executable program; and
   a memory, coupled to the processor, for storing the computer-executable program, wherein the computer-executable program, when executed by the processor, cause the processor to:
   register to a first network comprising an Evolved Packet Core (EPC) network and a second network comprising a 5G core (5GC) network using a first Universal Subscriber Identity Module (USIM) and a second USIM, respectively;
   select one of the first network and the second network to prevent a paging collision on the first network and the second network;
   when the first network is selected:
       determine, based on a current UE identity (ID), an offset value for a paging occasion calculation;
       transmit, by the first USIM, to the first network, the offset value via a tracking area update procedure or via an attach procedure;
       receive, by the first USIM, from the first network, a configured offset value for the paging occasion calculation;

forward, by a Non-Access-Stratum (NAS) layer of the UE, to a lower layer of the UE, the configured offset value;

determine a first UE ID based on the configured offset value; and perform the paging reception based on the first UE ID; and when the second network is selected:

initiate a UE ID reassignment procedure with the second network, the UE ID reassignment procedure comprising a registration procedure;

receive, by the second USIM, from an Access and Mobility Management Function (AMF) of the second network, a second UE ID via the UE ID reassignment procedure;

forward, by the NAS layer of the UE, to the lower layer of the UE, the second UE ID; and perform the paging reception based on the second UE ID.

8. The UE of claim 7, wherein the offset value and the configured offset value are different.

9. The UE of claim 7, wherein the offset value and the configured offset value are the same.

10. The UE of claim 7, wherein the computer-executable program, when executed by the processor, further cause the processor to:

before transmitting, to the first network, the offset value, receive, from the first network, a signal indicating that the first network supports receiving the offset value.

11. The UE of claim 7, wherein the computer-executable program, when executed by the processor, further cause the processor to:

register to a third network comprising the 5GC network by a third USIM;

determine to initiate the UE ID reassignment procedure with the third network;

receive, by the third USIM, from the third network, a third UE ID via the UE ID reassignment procedure after the UE determines to initiate the UE ID reassignment procedure;

forward, by the NAS layer of the UE, to the lower layer of the UE, the third UE ID; and perform the paging reception based on the third UE ID.

12. The UE of claim 7, wherein the computer-executable program, when executed by the processor, further cause the processor to:

before transmitting, to the first network, the offset value, determine that a paging occasion collision has occurred when the UE registers to the first network and the second network.

* * * * *